Dec. 29, 1970  YOSHIHIRO KONISHI  3,551,852
CIRCULATOR
Filed Dec. 9, 1968  3 Sheets-Sheet 1
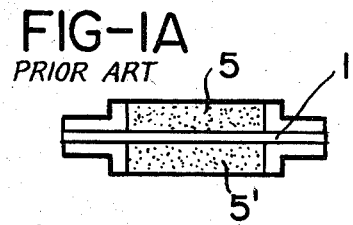
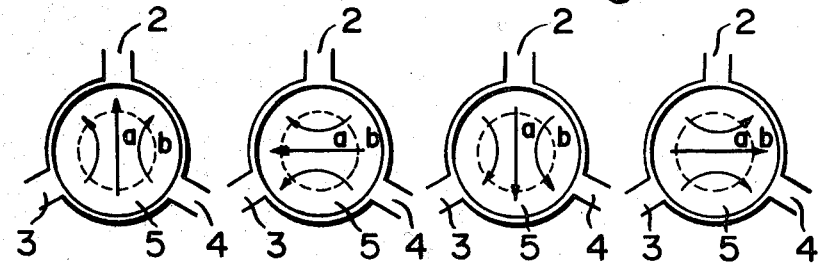
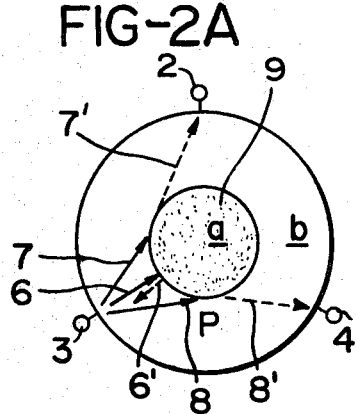
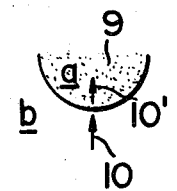
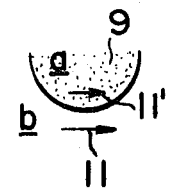
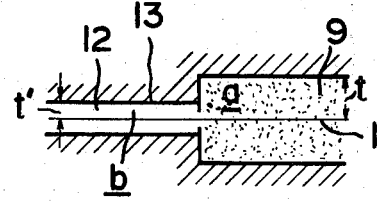
INVENTOR
YOSHIHIRO KONISHI
BY Stevens, Davis, Miller & Mosher
ATTORNEYS Dec. 29, 1970  YOSHIHIRO KONISHI  3,551,852
CIRCULATOR
Filed Dec. 9, 1968  3 Sheets-Sheet 2
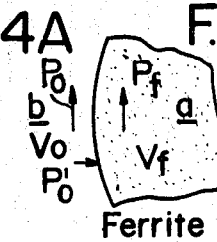
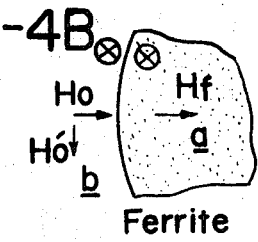
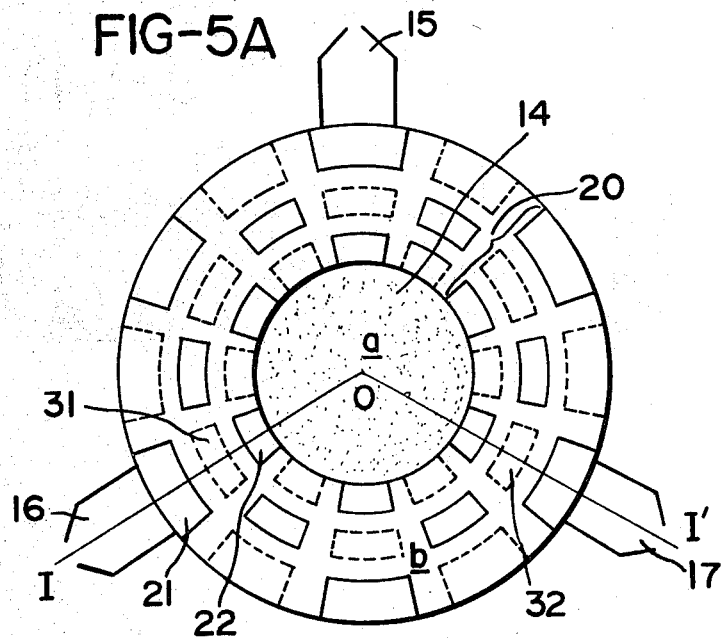
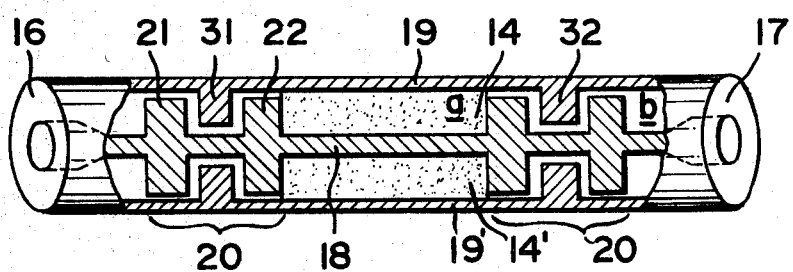
INVENTOR
YOSHIHIRO KONISHI
BY
ATTORNEYS Dec. 29, 1970  YOSHIHIRO KONISHI  3,551,852
CIRCULATOR Filed Dec. 9, 1968  3 Sheets-Sheet 3

INVENTOR
YOSHIHIRO KONISHI

BY

ATTORNEYS

United States Patent Office 3,551,852
Patented Dec. 29, 1970

3,551,852
CIRCULATOR
Yoshihiro Konishi, Sagamihara, Japan, assignor to Japan Broadcasting Corporation, Chiyoda-ku, Tokyo, Japan
Filed Dec. 9, 1968, Ser. No. 782,380
Claims priority, application Japan, Dec. 19, 1967, 42/80,870
Int. Cl. H01p 1/32; 5/12
U.S. Cl. 333—1.1      5 Claims

ABSTRACT OF THE DISCLOSURE

A circulator for use in the VHF band comprising ferrite plates loaded at the central portion of the center conductor, wherein peripheral portions of the ferrite plates, which are effective to produce a rotating magnetic field in the central portions of the ferrite plates but are not effective with respect to the non-reciprocal property of the circulator, are replaced by slow wave circuits in order to minimize the dimension of the ferrite plates so as to realize a lightweight and economized circulator especially suitable for use for high power VHF purposes.

BACKGROUND OF THE INVENTION

Field of the invention

The present invention relates to a high power circulator for use in the VHF band.

Description of the prior art

Recently a circulator has conveniently been utilized in transmitters for VHF or UHF bands by the reason of simplicity in construction, and application of such a circulator to high power transmitters has also been developed.

In the field of the UHF band, a circulator operable with a continuous wave (CW) of 15 kw. has been developed and is applicable in practical use. Such a high power circulator for use in the VHF band has not been realized in practice.

In a conventional circulator for use in the UHF band, the diameter of the ferrite plate or disc has been made as large as possible by taking into account its non-linearity and the temperature rise of ferrite. However, if the circulator for the VHF band is constructed in such a manner, the diameter of the ferrite disc will amount to 30 cm. at an operating frequency of 100 mHz. Accordingly, a great increase in the dimensions of the ferrite disc is unavoidable.

Therefore, the VHF circulator, which is formed by directly applying the UHF circulator to such structure, is not only less economical but also very heavy and inconvenient for installation.

From the background mentioned above, the invention is directed to high power circulators suitable for the VHF band with very economical use of ferrite.

SUMMARY OF THE INVENTION

In general, the nonreciprocal property of a ferrite disc, during application of a direct current (D.C.) magnetic field, is based upon the difference in permeability of the ferrite when the ferrite has applied thereto a high frequency magnetic field rotating in the clockwise direction, with respect to said D.C. magnetic field, from the permeability when the ferrite has applied thereto the same high frequency magnetic field but rotating in the counterclockwise direction.

This will be explained by referring to a circulator having a section as shown in FIG. 1A. In this circulator a center conductor 1 is provided at its periphery with three ports 2, 3 and 4 arranged in rotational symmetry and is sandwiched between a pair of ferrite discs 5 and 5'.

Let it be assumed that these three ports 2, 3 and 4 are excited by high frequency energy with the same amplitude in different phases of 0°, 120° and 240°, respectively, so that a high frequency magnetic field, as indicated by the arrows in FIGS. 1B-1 to 4, is produced on the surfaces of the ferrite discs 5 and 5' and rotating, with a lapse of time, in the sequence of FIGS. 1B-1, 2, 3, 4, 1, 2 . . . .

Then, if the direction of phase rotation of the exciting energy to be fed to the respective ports 2, 3 and 4 is reversed, the direction of rotation of the high frequency magnetic field is also reversed, that is, in the sequence of FIGS. 1B-1, 4, 3, 2, 1, 4 . . . .

Therefore, the ferrite discs 5 and 5' present different permeabilities corresponding to the direction of phase rotation of the exciting energy, and consequently the impedances of the ports 2, 3 and 4 differ in accordance with the direction of phase rotation of the exciting energy, respectively. Such difference in port impedances provides a basis for operation of the circulator.

As seen from FIG. 1B, it is only a central portion $a$ of the ferrite disc 5 that is responsive to the rotating excitation, while in the remaining peripheral portion, for example, the ring-shaped portion $b$ outside of the dotted circular portion $a$, the high frequency magnetic field is always maintained normal to the circumference of the disc 5 and does not rotate.

This is due to a boundary condition such that the high frequency current flows along the periphery of the center conductor because the latter is in a state of open impedance.

Accordingly, the peripheral region $b$ has a permeability of the same value for either positive or negative rotating excitation and hence it does not contribute to the non-reciprocal property of the circulator.

In fact, the peripheral region $b$ is necessary only for generating the rotating magnetic field of high frequency energy at the central region $a$ of the ferrite disc 5; however, the region $b$ does not contribute to the nonreciprocal property as described above.

Therefore, it is not essential that the region $b$ be made of ferrite. Thus, it can be replaced by a circuit element having the same propagation velocity as that of ferrite.

The present invention has been obtained by utilizing the above-mentioned principle. In accordance with the invention, the diameter of the ferrite disc is limited to a minimum value which is required for providing the non-reciprocal property of the circulator while the saved ring portion of the ferrite disc is constructed by a slow wave circuit assembly.

An a result of such construction, a high power circulator for the VHF band can be obtained which is materially economized in the diameter of the ferrite disc and has electrical properties fully comparable with those of known circulators utilizing the conventional-size ferrite disc.

For example, with a circulator of CW 10 kw. for the VHF band in accordance with the invention, the diameter of its ferrite disc is on the order of about 15 cm. in contrast with about 30 cm. in conventional structures, and its electrical properties are substantially the same as those of the conventional construction.

Therefore, a primary object of the present invention is to provide a circulator suitable for high power in the VHF band in which the dimensions of the ferrite disc of the circulator are minimized to reduce the size of the circulator itself, while maintaining its electrical properties at a level comparable with those of conventional circulators.

A further object of the invention is to provide a circulator for the VHF band having such a construction that the ferrite material, which is of considerably high cost at present time, can materially be saved so as to render a reduction in production cost of the circulator.

BRIEF DESCRIPTION OF THE DRAWINGS

FIGS. 1A and 1B are schematic views for explaining the operational principle of a circulator, wherein FIG. 1A is a schematic view of a cross section of a known strip line circulator, FIGS. 1B–1, 1B–2, 1B–3 and 1B–4 are the schematic plan views thereof for explaining the rotating magnetic field in the ferrite disc of the circulator when the latter is excited at the three terminal ports by exciting energy in positive or negative phase rotation, respectively;

FIG. 2A is a schematic view for explaining the operational principle of a circulator of the invention showing the reflecting condition of electromagnetic wave at the boundary of the ferrite zone and air zone when the peripheral ferrite zone $b$, as shown in FIG. 1B–1, is replaced by an air layer;

FIG. 2B and FIG. 2C are schematic diagrams showing vector components of the electromagnetic wave propagating in the radial and circumferential directions of the ferrite element and incident to point P, respectively;

FIG. 3 is an explanatory view, in section, of impedance matching of a known circulator as shown in FIG. 1A;

FIG. 4A is an explanatory diagram of the circumferential component shown in FIG. 2C;

FIG. 4B is an explanatory diagram of the extra higher mode magnetic field generated by the difference of phase velocities between the inside and the outside of the ferrite disc;

FIGS. 5A and 5B show a partial section view and a plan view, respectively, of an embodiment of a circulator according to the invention comprising a microwave circuit construction;

DESCRIPTION OF THE PREFERRED EMBODIMENTS

Figure 6:
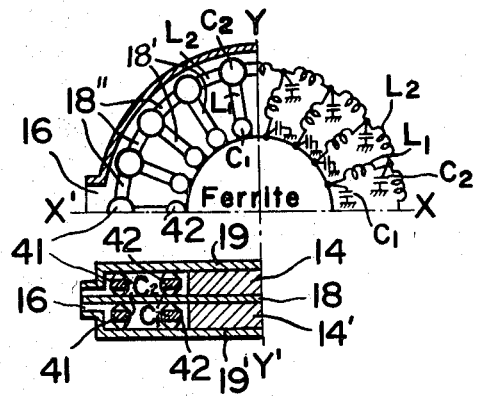
FIG. 6 is a schematic view in part showing the inside construction of another embodiment of a circulator according to the invention comprising a lumped constant circuit assembly.

At first, the conditions which must be fulfilled by a slow wave circuit used in the embodiments of the invention will be explained hereinbelow.

The circulator according to the invention is constructed in a manner such that in a conventional circulator, as shown in FIGS. 1B–1 to 4, the diameter of the ferrite disc is limited to the minimum value (region $a$) necessary to contribute to formation of a rotating magnetic field of high frequency and the remaining region $b$, which has been needed heretofor for impedance matching, is replaced by a slow wave circuit. In order to facilitate the understanding of the electrical characteristics required for such a slow wave circuit, the case in which the region $b$ is replaced by air will be considered, assuming that the center conductor has a diameter larger than that of the ferrite region $a$.

FIG. 2 shows the relation between the ferrite disc and the incident electromagnetic wave under this structural condition. In FIG. 2A an electromagnetic wave which travels from a port 3 along arrows 6, 7 and 8 is taken into consideration. Due to the difference in characteristic impedance between the air region $b$ and the ferrite region $a$, as mentioned above, a major portion of the energy of the incident electromagnetic wave is reflected on the boundary face of the ferrite disc 9 corresponding to the side face of the region $a$, as indicated by dotted lines 6', 7' and 8', and then a greater portion of reflected energy travels toward the ports 2 and 4. As can be seen from this, only a minor portion of the energy of the incident electromagnetic wave is caused to enter the ferrite disc 9. For further detail consideration of this condition, the electromagnetic wave 8 which reached a point P in FIG. 2A is analyzed into a radial component 10, as shown in FIG. 2B, and a circumferential component 11, as shown in FIG. 2C. In order to enable the radial component 10 to enter the ferrite disc 9, as indicated by 10' in FIG. 2B, the characteristic impedance of the region $b$, replaced by air, and that of the ferrite disc 9 must be equal to each other. Provided that the respective thickness of the ferrite region $a$ and the air region $b$ between the center conductor and the outer ground conductor are equal, the wave impedance of the ferrite element is larger than that of the air region $b$ by a factor of $$\sqrt{\frac{\mu_s}{\epsilon_s}}$$

i.e. in the order of $\frac{1}{2}$ to $\frac{1}{3}$ times, wherein $\mu_s$ is specific permeability of ferrite with a value of 2 to 3 and $\epsilon_s$ is specific permittivity with a value of 12 to 15. Therefore, the greater part of the energy of the radial component 10 is reflected at the point P.

In order that the characteristic impedance of the air layer may be made equal to that of the ferrite disc, such steps as shown in FIG. 3 by a partially schematic view may be taken, wherein the thickness $t'$ of the air region $b$, which is interposed between the center conductor 1 and the ground conductor 13, is reduced to $\frac{1}{2}$ to $\frac{1}{3}$ times the thickness $t$ of the ferrite disc 9. However, according to this construction, the propagation constant of the air in the radial direction of the ferrite element equals $$\frac{1}{\sqrt{\mu_s \epsilon_s}}$$

times the propagation constant of the ferrite in the same direction, and consequently the propagation constant in the region $b$ consisting of air is greater than that filled with ferrite by a factor of $\sqrt{\mu_s \epsilon_s}$, for example, a factor of 6 to 7 with the above-mentioned values of $\mu_s$ and $\epsilon_s$. In order to eliminate such difficulty it is desirable to shorten the effective operating wavelength in said radial direction.

Moreover, with the slow wave circuit, the boundary condition of the circumferential wave component 11 on the periphery of the ferrite disc 9, shown in FIG. 2C, must be satisfied as described hereinbelow. The propagation velocity $V_f$ of the electromagnetic wave in the radial direction of the ferrite disc has a slow velocity which corresponds to $$\frac{1}{\sqrt{\mu_s \epsilon_s}}.$$

times the propagation velocity $V_o$ in the air of the region $b$, replaced by air. Generally, when the electromagnetic wave travels, as shown in FIG. 4A, in the direction along the boundary of two kinds of mediums $a$ and $b$, having different phase velocities respectively, a Poynting power $P_o'$, having a phase difference of 90° with respect to Poynting powers $P_o$ and $P_f$ of said electromagnetic wave, is produced in the direction normal to the boundary face, resulting in an extra magnetic field of high frequency $H_o'$ parallel to the boundary face in addition to the original magnetic fields of high frequency $H_o$ and $H_f$ normal to the boundary face, as shown in FIG. 4B. By this extra magnetic field $H_o'$, higher modes of the wave are produced in the region $b$, and undesired high frequency energy based thereupon acts so as to decrease the bandwidth and increase insertion loss. With the reasons mentioned above, the phase velocity of the circumferential component wave in the region $b$ must be slowed down to the order of that in the ferrite.

In summary, conditions which are required for the slow wave circuit to be substituted for the region $b$ according to the invention are as follows:

(1) In the radial direction, it has the same characteristic impedance as that of the ferrite disc.

(2) In the circumferential direction, it has the same propagation velocity of electromagnetic wave as that of the ferrite disc.

(3) For realization of a smaller-sized circulator than conventional ones, the slower wave propagation velocity in the radial direction is preferable to that in the ferrite disc.

FIGS. 5A and 5B represent an embodiment of the invention in which the region b of the ferrite disc 5 in FIG. 1B is constructed by a slow wave circuit consisting of a distributed slow wave structure, FIG. 5A being a plan view and FIG. 5B being a sectional view taken along a line I–O–I' in FIG. 5A.

In FIGS. 5A and 5B, numerals 14 and 14' designate a pair of ferrite discs which have a diameter of the minimum value required to contribute to generation of a high-frequency rotating magnetic field, that is, a diameter of the ferrite region a in FIG. 1B. Numerals 15, 16 and 17 designate signal terminals or ports disposed in rotational symmetrical-configuration, 18 a center conductor in the form of a circular plate which is coupled with the ports 15, 16 and 17 and interposed between the ferrite disc pair 14 and 14', and 19 and 19' a pair of outer conductors. Numeral 20 designates a portion which corresponds to the region b in FIG. 1B and is constructed as a three-dimensional slow wave circuit in a manner such that a plurality of projections 21, 22 . . . 31, 32 . . . which are provided on the center conductor 18 and the insides of the outer conductors 19 and 19' in rotational symmetrical configuration, respectively, are arranged in alternate relation in both the radial and circumferential directions. In FIG. 5A a plurality of sections indicated by the dotted lines represents downward projections of the outer conductor 19 and a plurality of sections indicated by the full lines represents upward projections of the center conductor 18. As an alternative, such a three-dimensional slow wave circuit may be constructed by providing only the inside of the outer conductor with a number of projections such as a corrugated structure. According to the three-dimensioned slow wave circuit described above, such a circulator can be realized that its characteristic impedance in the radial direction and its slow wave characteristics in both the radial and circumferential directions can be set to any of the desired values along with a remarkable saving of the ferrite material.

FIG. 6 shows another embodiment of the invention which is constructed by substituting a lumped constant circuit, comprising capacitance and inductance elements, for the three-dimensional slow wave circuit of the first embodiment. On the two-dimensional plane, including co-ordinate axes X–X' and Y–Y' of FIG. 6, part of the equivalent circuit of the lumped constant circuit is shown in the first quadrant, i.e. the X–Y quadrant, and a partial plan view of the main part of its internal structure corresponding thereto and a sectional view thereof are illustrated in the second and third quadrants, respectively. In this embodiment a pair of ferrite plates 14 and 14', having the same diameter as that of the first embodiment, are arranged in the outer conductors 19 and 19' in the same manner as in FIG. 5. However, the peripheral portion of the inner conductor 18 is formed in a lattice shape, which comprises radially extending arms 18' and annularly extending arms 18'' as shown in the X'–Y quadrant of FIG. 6. These arms operate as a strip line inductance for the operational frequency of the circulator, and their inductances are $L_1$ and $L_2$, respectively. An equivalent diagram is shown in the X–Y quadrant. Moreover, a plurality of capacitances $C_1$, $C_2$ . . . such as capacitors 41, 42 . . . made of oxide beryllium, are arranged between the center conductor 18 and the outer conductor pair 19 and 19' around the ferrite discs 14 and 14' in rotational symmetrical-configuration and connected through the inductances. In FIG. 6 numeral 16 designates one of the three ports of the Y circulator.

In this case, respective values of an inductance element L and a capacitance element C, which are included in the L C lumped constant circuit, can be determined approximately by the following relations:

$$L = \frac{z_0 h}{2v} \cdot \mu_s$$

$$C = \frac{2}{z_0 v h} \cdot \left(\frac{\pi D}{n}\right)^2 \cdot \epsilon_s$$

wherein D is a diameter of the lumped constant circuit portion (hereinafter referred to as a delay circuit section) placed around the ferrite disc, n is a number of such delay circuit sections around the periphery of the ferrite discs, $Z_0$ is a wave impedance of plane wave in air with a value of 377Ω, v is light velocity, $$\mu_s = \frac{\mu_{+s} + \mu_{-s}}{2}$$

in which $\mu_{+s}$ and $\mu_{-s}$ are specific permeabilities of positive and negative circular-polarized waves, respectively, h is a thickness of the ferrite, and $\epsilon_s$ is the specific permittivity of ferrite.

As compared with the first embodiment, the circulator according to this embodiment can easily be realized and can be assembled in a fairly small size.

Figure 7:
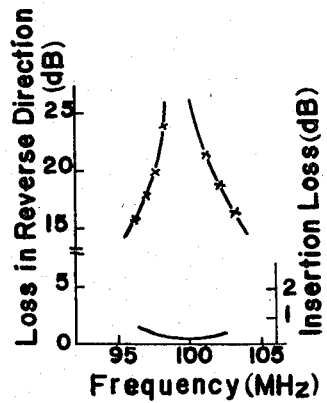
FIG. 7 is a characteristic diagram thereof.

Further, the electrical properties of the circulator according to the invention can bear comparison with those of conventional structures. As an example, the electrical properties of the circulator according to the invention, which comprises a slow wave circuit consisting of a lumped constant circuit as in FIG. 6, are illustrated in FIG. 7. In this figure, the upper lines, indicated by –x–, show the loss of the circulator in the reverse direction, or backward loss, and the lower full line shows an insertion loss. In this example, the center frequency was 100 mHz., the diameter of the pair of ferrite discs was 150 mm., the thickness of each disc was 10 mm., the ferrite disc was made of material such as Al substituted YIG (Al-substituted yttrium iron garnet) with a value of 600 gauses as $4\pi M s$ (Ms: saturation magnetization), and each constant of the lumped constant elements, shown in FIG. 6 as $L_1$, $L_2$, $C_1$ and $C_2$, were as follows:

$$L_1 = 1.8 \times 10^{-8} [H]$$

$$L_2 = 2.02 \times 10^{-8} [H]$$

$$C_1 = 4.05 [pF]$$

$$C_2 = 5.7 [pF]$$

For the capacitors $C_1$, $C_2$, oxide beryllium having a favorable temperature conduction factor were used, and in order to carry out forced-air cooling with good efficiency, their caps were provided with cooling-fin members.

According to this example, as seen from FIG. 7, static characteristics with an insertion loss of 0.2 db, a loss in reverse direction of 20 db and bandwidth of 4.5 mHz, were obtained. Further, it was found in the power test with CW of 10 kw. that non-linearity was not affected adversely at all and the temperature rise of the ferrite disc was 5° C. while the outer portion of the circulator showed little temperature rise.

What is claimed is:

1. A circulator comprising inner and outer conductors, at least one ferrite plate between the inner and outer conductors, a plurality of coaxial terminal ports arranged in rotationally symmetrical positions and each being coupled to the inner conductor, a slow wave circuit having substantially the same high frequency characteristic as said at least one ferrite plate and being formed in a distributed form of rotationally symmetrical configuration over the whole of a space formed between the outer conductors and the peripheral wall of the at least one ferrite plate, and a magnetic system to apply a DC magnetic field to the at least one ferrite plate, wherein said at least one ferrite plate has a minimum size necessary for effecting rotation of high frequency energy applied to the circulator.

2. A circulator as claimed in claim 1, wherein said slow wave circuit comprises a three-dimensional slow wave structure.

3. A circulator as claimed in claim 2, wherein the three-dimensional slow wave structure is formed by the outer conductors, at least one of the outer conductors having projecting portions the form of which is complementary with projecting portions provided on the inner conductor so as to produce a slow wave effect for the operational frequency of the circulator.

4. A circulator as claimed in claim 1, wherein the slow wave circuit comprises a lumped element network formed by a plurality of series-connected inductors and a plurality of parallel-connected capacitors arranged in rotational symmetry and the inductors are formed by strip line elements extending in radial and annular directions.

5. A circulator as claimed in claim 4, wherein the strip line inductors are formed by an outer peripheral part of the inner conductor of the circulator which is formed in a lattice configuration having radially extending arms and annularly extending arms and a plurality of capacitors of lumped type are inserted between the inner and outer conductors at locations distributed along the peripheral portion of the inner conductor in rotational symmetry.

References Cited
UNITED STATES PATENTS

| | | | |
|---|---|---|---|
| 3,174,116 | 3/1965 | Sur | 333—1.1 |
| 3,286,201 | 11/1966 | Roberts, Jr. | 333—1.1 |
| 3,304,519 | 2/1967 | Weiss | 333—1.1 |

PAUL L. GENSLER, Primary Examiner

U.S. Cl. X.R.

333—84